US011161551B2

(12) United States Patent
Honko

(10) Patent No.: US 11,161,551 B2
(45) Date of Patent: Nov. 2, 2021

(54) VEHICLE BODY SIDE STRUCTURE AND PARTITION MEMBER

(71) Applicant: HONDA MOTOR CO., LTD., Tokyo (JP)

(72) Inventor: Masanori Honko, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/881,110

(22) Filed: May 22, 2020

(65) Prior Publication Data
US 2020/0369326 A1 Nov. 26, 2020

(30) Foreign Application Priority Data
May 22, 2019 (JP) .............................. JP2019-095759

(51) Int. Cl.
| | |
|---|---|
| *B62D 25/02* | (2006.01) |
| *B62D 27/02* | (2006.01) |
| *B62D 29/04* | (2006.01) |
| *B62D 25/04* | (2006.01) |

(52) U.S. Cl.
CPC ........... *B62D 25/025* (2013.01); *B62D 25/04* (2013.01); *B62D 27/023* (2013.01); *B62D 29/048* (2013.01)

(58) Field of Classification Search
CPC ...... B62D 25/04; B62D 25/025; B62D 27/02; B62D 27/023; B62D 29/001; B62D 29/002; B62D 29/005; B62D 29/048

USPC ............................................ 296/193.06, 209
See application file for complete search history.

(56) References Cited

U.S. PATENT DOCUMENTS

| | | | | |
|---|---|---|---|---|
| 7,140,668 | B2 * | 11/2006 | Wesch ................. | B62D 29/002 296/187.02 |
| 10,589,791 | B2 * | 3/2020 | Murata ................. | B62D 65/02 |
| 10,625,786 | B2 * | 4/2020 | Marukawa ............. | B62D 25/04 |
| 2012/0153680 | A1 * | 6/2012 | May ....................... | B62D 25/04 296/203.03 |

FOREIGN PATENT DOCUMENTS

JP         4045812 B2    2/2008

* cited by examiner

*Primary Examiner* — Dennis H Pedder
(74) *Attorney, Agent, or Firm* — Rankin, Hill & Clark LLP

(57) ABSTRACT

A vehicle body side structure includes: a side sill extending in a vehicle front-rear direction; a center pillar outer part that extends upward from the side sill; a center pillar inner part arranged on a vehicle width direction inner side of the center pillar outer part; and a partition member arranged in a hollow space defined by the center pillar outer part and the center pillar inner part, the partition member extending in the vehicle front-rear direction. The partition member includes: a main body part; a recess portion having a tubular shape, the recess portion being formed by the main body part being partially recessed downward; and a rib extending downward from a lower face of the recess portion, the rib being in abutment with an upper face of the side sill.

8 Claims, 6 Drawing Sheets

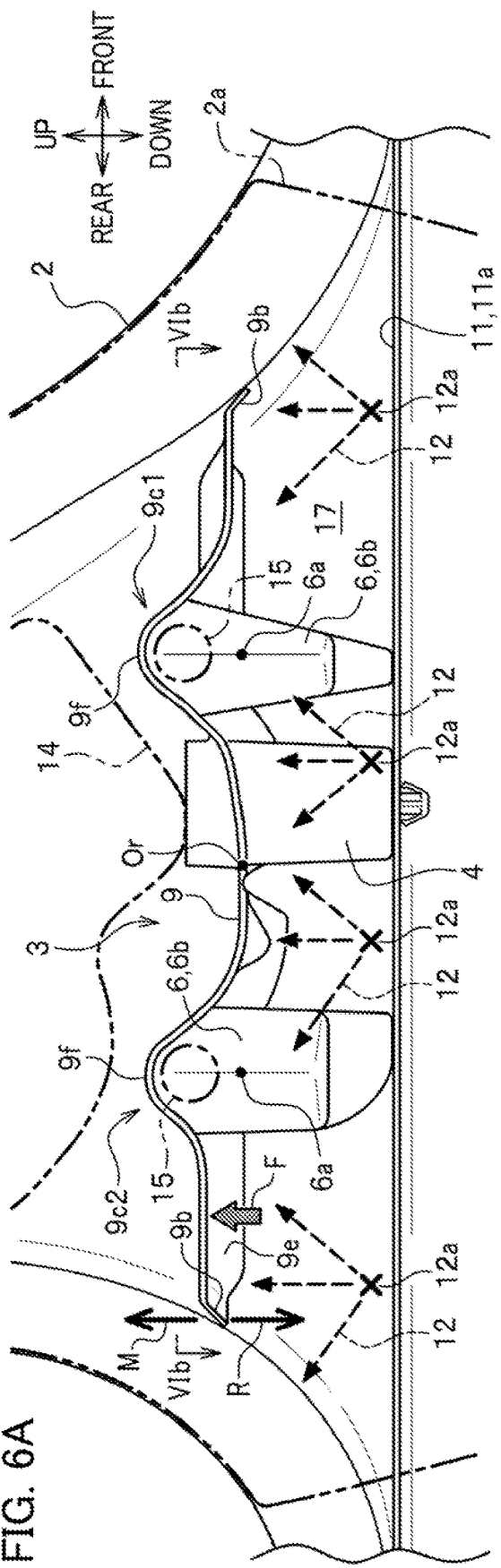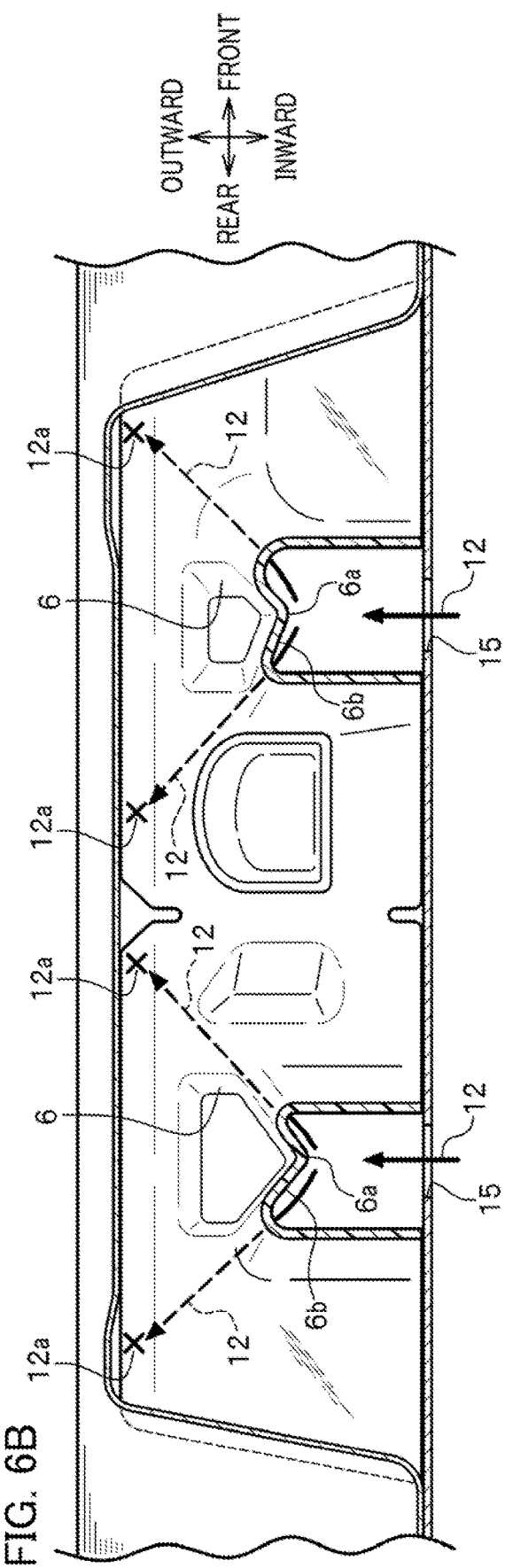

VEHICLE BODY SIDE STRUCTURE AND PARTITION MEMBER

CROSS-REFERENCE TO RELATED APPLICATIONS

The present application claims priority under 35 U.S.C. § 119 to Japanese Patent Application No. 2019-095759, filed May 22, 2019, the disclosure of which is herein incorporated by reference in its entirety.

BACKGROUND OF THE INVENTION

1. Field of the Invention

The present invention relates to a vehicle body side structure and a partition member.

2. Description of Related Art

Conventionally, there is known a vehicle body side structure in which a foam substrate and a partition member is provided in a hollow space of a pillar with a closed cross section to improve the soundproofing performance of a vehicle body (see, for example, Publication of Japanese Patent No. 4045812).

This partition member includes a substantially rectangular flat main body part that supports a foam substrate and a flange part extending upward from a side of the main body part to define an L-shaped cross section together with the main body part.

The flange of the partition member is joined to an inner wall surface of a center pillar by spot welding so that a hollow space of the center pillar is partitioned into upper and lower parts by the flat main body part.

SUMMARY OF THE INVENTION

On the other hand, recent center pillars have lower parts joined to a side sill via a joint having a complicated shape. Due to this, when attempting to install the conventional partition member (see, for example, Publication of Japanese Patent No. 4045812) in a lower part of a center pillar, the operation for welding the partition member to an inner wall surface of the center pillar is significantly complicated.

In view of this, it is possible to conceive of a vehicle body side structure such that a partition member is attached to an upper face of a side sill via an engagement part formed under a main body part of the partition member. Such a vehicle body side structure makes it quite easy to install the partition member in a lower part of a center pillar compared with conventional vehicle body side structures (see, for example, Publication of Japanese Patent No. 4045812).

Incidentally, in such a vehicle body side structure, it is possible to conceive of a structure such that the partition member is provided with a rib or the like extending downward from the main body part of the partition member in order to create a filling space for filler between the upper face of the side sill and the main body part.

However, the rib of the partition member needs to be increased in length to create a sufficient filling space for filler between the upper face of the side sill and the main body part. The vehicle body side structure with such a rib could suffer from the insufficient rigidity of the rib and the difficulty in integrally forming the main body part and the rib.

In view of the foregoing, it is an object of the present invention to provide a vehicle body side structure including a partition member such that a sufficient filling space for filler can be created between the partition member and a side sill and that a rib of the partition member can be reduced in length. Another object of the present invention is to provide such a partition member.

An aspect of the present invention that can achieve the above-described object is a vehicle body side structure including: a side sill extending in a vehicle front-rear direction; a center pillar outer part that extends upward from the side sill; a center pillar inner part arranged on a vehicle width direction inner side of the center pillar outer part; and a partition member arranged in a hollow space defined by the center pillar outer part and the center pillar inner part, the partition member extending in the vehicle front-rear direction. The partition member includes: a main body part; a recess portion having a tubular shape, the recess portion being formed by the main body part being partially recessed downward; and a rib extending downward from a lower face of the recess portion, the rib being in abutment with an upper face of the side sill.

Another aspect of the present invention that can achieve the above-described object is a partition configured to be arranged on a side sill to partition a hollow space of a center pillar into upper and lower parts, the partition member including: a main body part; a recess portion having a tubular shape, the recess portion being formed by the main body part being partially recessed downward; and a rib extending from a lower face of the recess portion, the rib being to be in abutment with an upper face of the side sill.

The present invention can provide a vehicle body side structure including a partition member such that a sufficient filling space for filler can be created between the partition member and a side sill and that a rib of the partition member can be reduced in length. The present invention can also provide such a partition member.

BRIEF DESCRIPTION OF THE DRAWINGS

FIG. 6A is a side view of the partition member installed in the hollow space of the center pillar, as viewed from a vehicle width direction inner side.

FIG. 6B is a cross-sectional view taken along line VIb-VIb in FIG. 6A.

DETAILED DESCRIPTION OF THE EMBODIMENTS

Figure 1:
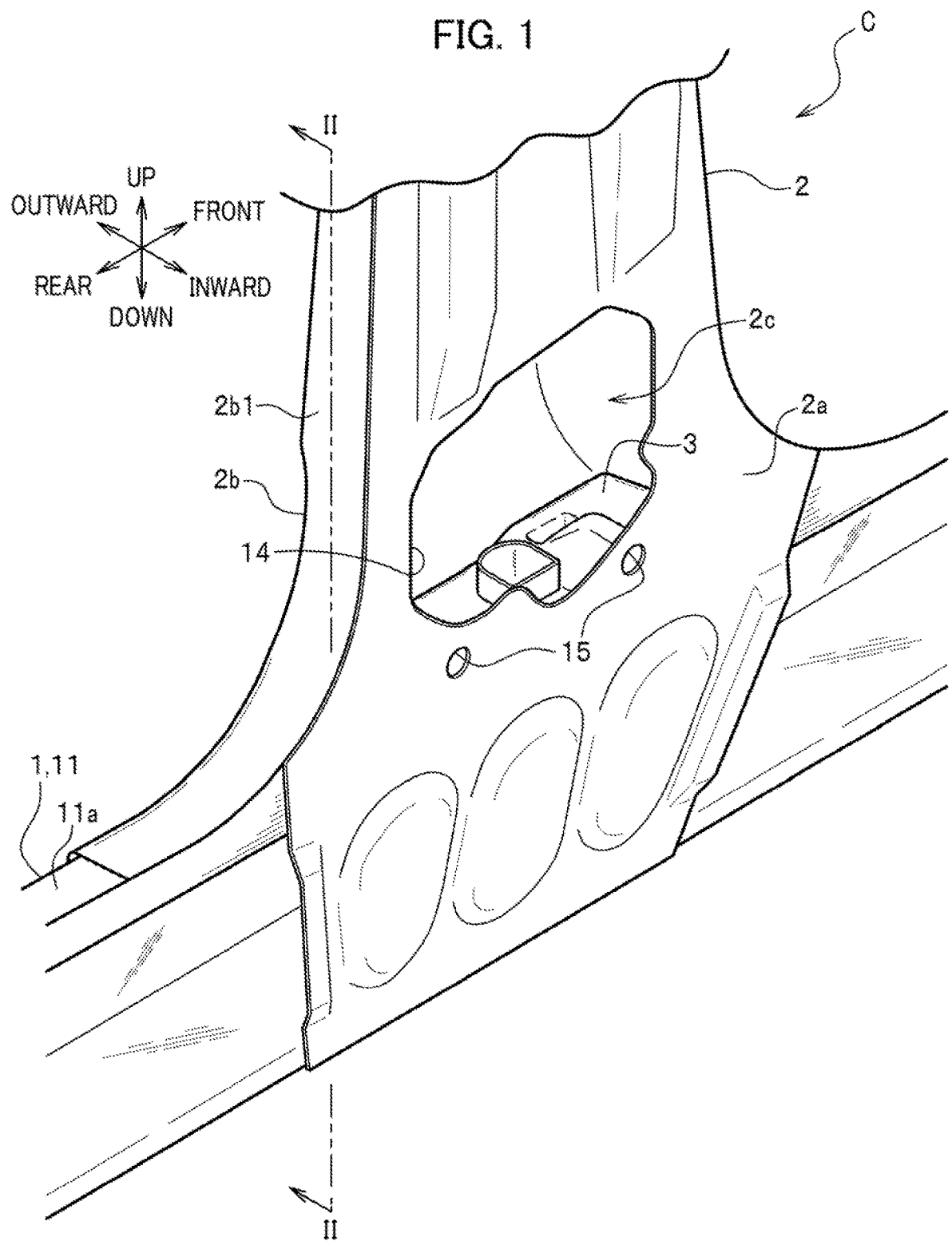
FIG. 1 is a partially enlarged perspective view of a vehicle body side structure according to an embodiment of the present invention.

Next, a vehicle body side structure according to a mode (present embodiment) for carrying out the present invention will be described in detail with reference to the drawings as appropriate. The up, down, front and rear directions indicated in the drawings respectively correspond to the up, down, front and rear directions of the vehicle body. The inward and outward directions indicated in the drawings respectively correspond to the vehicle width direction inner side and vehicle width direction outer side.

The vehicle body side structure according to the present embodiment has a center pillar having a hollow space therein and joined to a side sill. The hollow space is partitioned into an upper part and a lower part by a partition member.

The partition member of the vehicle body side structure is characterized mainly in that the partition member includes: a main body part; a recess portion having a tubular shape, the recess portion being formed by the main body part being partially recessed downward; and a rib extending downward from a lower face of the recess portion, the rib being in abutment with an upper face of the side sill.

Hereinafter, the partition member will be described by taking an example which partitions the hollow space of the center pillar to form a filling chamber for filling a foamable resin (filler). Incidentally, the filling structure of the foamable resin in the center pillar works to prevent road noise and wind noise occurring during the traveling of the vehicle from being transmitted to an occupant, which wind noise is generated by a member included in the vehicle body.

This vehicle body side structure can be applied to the left and right sides of the vehicle body.

Hereinafter, the vehicle body side structure on the left side will only be described, and description of the vehicle body side structure on the right side, which is symmetrical to the vehicle body side structure on the left side with respect to a virtual center line located centrally with respect to the vehicle width direction length of the vehicle body, will be omitted.

FIG. 1 is a partially enlarged perspective view of a vehicle body side structure C according to the present embodiment.

Note that although FIG. 1 shows a side sill 1, illustration of a side sill inner part included in the side sill 1 is omitted for the sake of convenience of drawing.

As illustrated in FIG. 1, the vehicle body side structure C includes the side sill 1, a center pillar 2, and a partition member 3.

Side Sill

As illustrated in FIG. 1, the side sill 1 is arranged to extend in the vehicle front-rear direction at a lateral side part of a vehicle body.

The side sill 1 includes a side sill inner part (not shown) arranged on an inner side in the vehicle width direction and a side sill outer part 11 arranged on an outer side in the vehicle width direction.

The side sill outer part 11 has a hat shape that opens inward in the vehicle width direction in a cross section taken along a plane intersecting the vehicle front-rear direction. The side sill inner part (not shown) has a hat shape that opens outward in the vehicle width direction in a cross section taken along a plane intersecting the vehicle front-rear direction.

The side sill inner part (not shown) and the side sill outer part 11 each have flanges corresponding to the brim of the corresponding hat shape and their flanges are joined to each other by spot welding or the like. In addition, the side sill inner part (not shown) and the side sill outer part 11 each have a projected portion corresponding to the crown of the corresponding hat shape. Consequently, their projected portions integrally define a closed cross section of the side sill 1.

A center pillar inner part 2a included in the below-described center pillar 2 is interposed between the flanges of the side sill inner part (not shown) and the flanges of the side sill outer part 11 and is joined to them to form three stacked layers.

The side sill outer part 11 has an upper face 11a in which an attachment hole 1b (see FIG. 2) to which the partition member 3 is attached is formed, as described below.

Although illustration is omitted, a plurality of reinforcement members are disposed at appropriated places inside the side sill 1.

Center Pillar

The center pillar 2 (see FIG. 1) is a columnar member that extends in an up-down direction at the vehicle body lateral side part.

As shown in FIG. 1, the center pillar 2 has a lower portion joined to the side sill 1. Although illustration is omitted, the center pillar 2 has an upper portion joined to a roof side rail.

Note that the center pillar 2 of the present embodiment is inclined slightly such that the center pillar 2 gradually extends toward the rear of the vehicle body as it extends upward from the lower portion.

The center pillar 2 includes the center pillar inner part 2a arranged on an inner side in the vehicle width direction and a center pillar outer part 2b arranged on an outer side in the vehicle width direction.

Center Pillar Inner Part

The center pillar inner part 2a is formed of a substantially plate-like body extending upward from a lower portion thereof interposed between the flanges of the side sill inner part (not shown) and the flanges of the side sill outer part 11.

The center pillar inner part 2a substantially defines the external shape of the center pillar 2 in side view seen from the inner side in the vehicle width direction. The center pillar inner part 2a has a lower portion that has a wide width on the side of the side sill 1 and has a vehicle front-rear direction width that decreases as the lower portion extends upward. Specifically, the lower portion of the center pillar inner part 2a has two edge portions located opposite each other in the vehicle front-rear direction and extending downward such that they asymptotically approaches the upper face 11a of the side sill outer part 11. In other words, the two vehicle front-rear direction edge portions of the lower portion of the center pillar inner part 2a has a gentle curve that is convex in the downward direction.

Incidentally, as the center pillar 2 of the present embodiment is inclined slightly rearward as described above, the curve formed on the vehicle front-rear direction front side of the center pillar 2 has a more gradual arc than that of the curve formed on the vehicle front-rear direction rear side.

The lower portion of the center pillar inner part 2a has a substantially rectangular-shaped opening 14 located substantially centrally with respect to the vehicle front-rear direction length of the center pillar inner part 2a.

The opening 14 allows communication between the interior and the exterior of the hollow space 2c of the center pillar 2, on an inner side in the vehicle width direction. As described in detail below, the opening 14 is used as an opening through which the partition member 3 is to be installed in the hollow space 2c of the center pillar 2.

Incidentally, the opening 14 of the present embodiment is assumed to be also used to install a seat belt retractor (not shown) in the hollow space 2c of the center pillar 2.

The lower portion of the center pillar inner part 2a has injection holes 15 through which the below-described foamable resin is filled. These injection holes 15 are formed as a pair of holes which is located under two lower corners of the opening 14, which two lower corners are located opposite each other in the vehicle front-rear direction.

These injection holes 15 communicate with the below-described filling chamber 17 (see FIG. 2) formed between the partition member 3 and the upper face 11a of the side sill outer part 11.

Center Pillar Outer Part

Next, a description will be given of the center pillar outer part 2b (see FIG. 1).

Although illustration is omitted, the center pillar outer part 2b has a hat shape that opens inward in the vehicle width direction in a cross section taken along a plane intersecting the up-down direction.

The center pillar outer part 2b has two flanges corresponding to the brim of the hat shape. The two flanges are welded to the two vehicle front-rear direction edge portions of the center pillar inner part 2a (see FIG. 1) by spot welding or the like.

With this structure, the center pillar outer part 2b has a wide width on the side of the side sill 1 and has a vehicle front-rear direction width that decreases as the center pillar outer part 2b extends upward, in accordance with the shape of the center pillar inner part 2a, as shown in FIG. 1.

That means, like the center pillar inner part 2a, the lower portion of the center pillar outer part 2b has two edge portions located opposite each other in the vehicle front-rear direction and extending downward such that they asymptotically approaches the upper face 11a of the side sill outer part 11. In other words, the two edge portions of the lower portion of the center pillar outer part 2b, which are located opposite each other in the vehicle front-rear direction, each have a gentle curve that is convex in the downward direction.

The center pillar outer part 2b has a projected portion 2b1 corresponding to the crown of the hat shape and defining the hollow space 2c between the projected portion 2b1 and the center pillar inner part 2a, as shown in FIG. 1.

Figure 2:
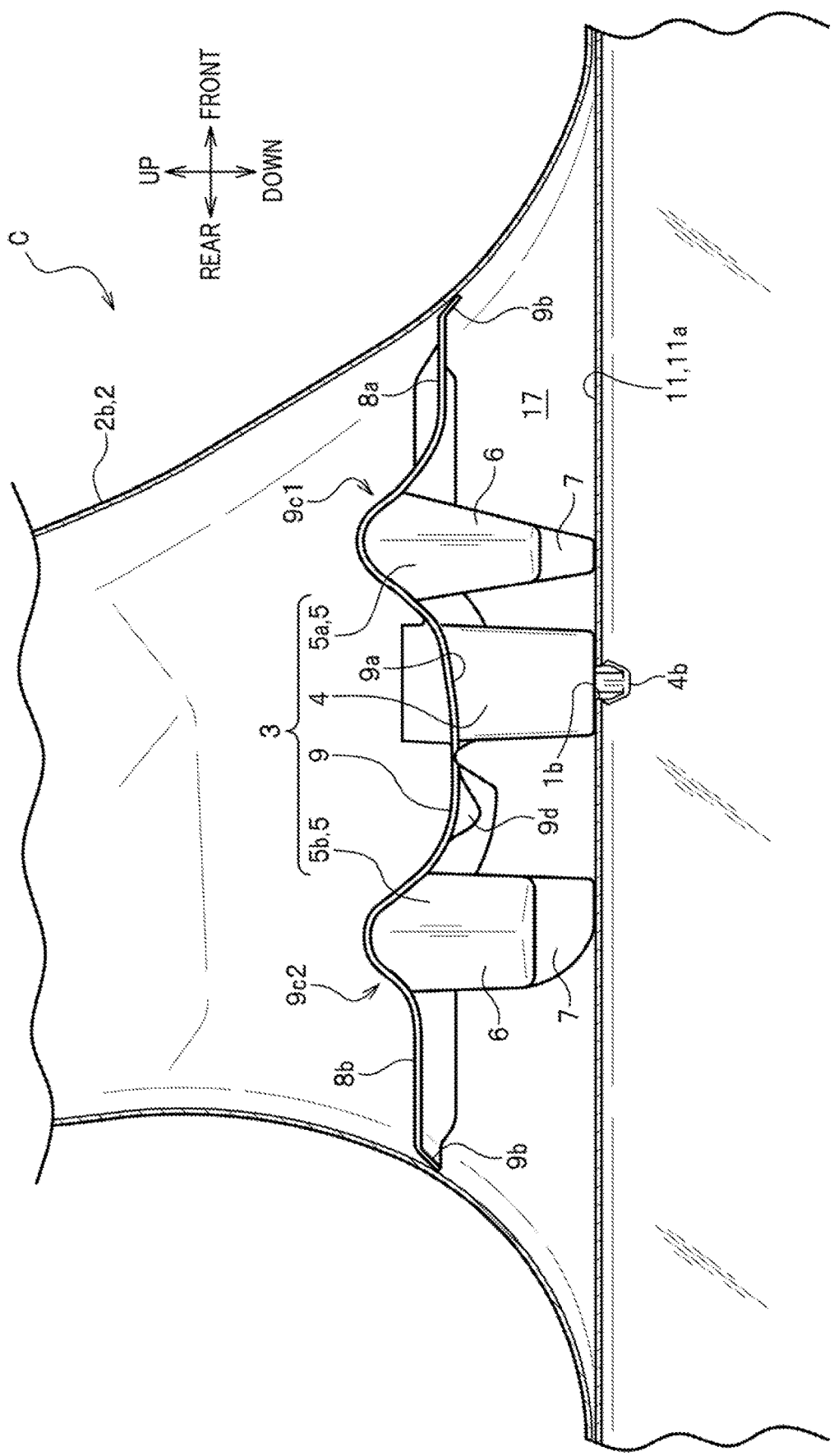
FIG. 2 is a cross-sectional view taken along line II-II in FIG. 1.

FIG. 2 is a cross-sectional view taken along line II-II in FIG. 1. Note that in FIG. 2, the partition member 3 is drawn in a side view as seen from inside in the vehicle width direction, omitting illustration of the cross section of the partition member 3.

As shown in FIG. 2, the center pillar outer part 2b has two opposite side surfaces located opposite each other in the vehicle front-rear direction and a distance between the side surfaces in the vehicle front-rear direction increases as they extend toward their lower ends. The two opposite side surfaces of the center pillar outer part 2b each have a lower portion that extends along the upper face 11a of the side sill outer part 11.

The lower end portions of the two opposite side surfaces of the center pillar outer part 2b are welded to the upper face 11a of the side sill outer part 11 by spot welding or the like.

In FIG. 2, reference numeral 1b designates an attachment hole which is formed in the upper face 11a of the side sill outer part 11 and to which the partition member 3 is to be attached. A clip 4b, which is described in detail below, of the partition member 3 is inserted into this attachment hole 1b.

Although illustration is omitted, the center pillar outer part 2b (see FIG. 1) has a lower portion which is inclined such that the lower portion gradually extends outward in the vehicle width direction as it extends upward. The lower end edge of the center pillar outer part 2b is welded to an outer side face of the side sill outer part 11 by spot welding or the like.

Partition Member

Next, a description will be given of the partition member 3 (see FIG. 2).

As shown in FIG. 2, the partition member 3 includes a main body part 9, an engagement part 4, and support parts 5 as major parts.

The partition member 3 according to the present embodiment is assumed to be made of a synthetic resin.

Figure 3A:
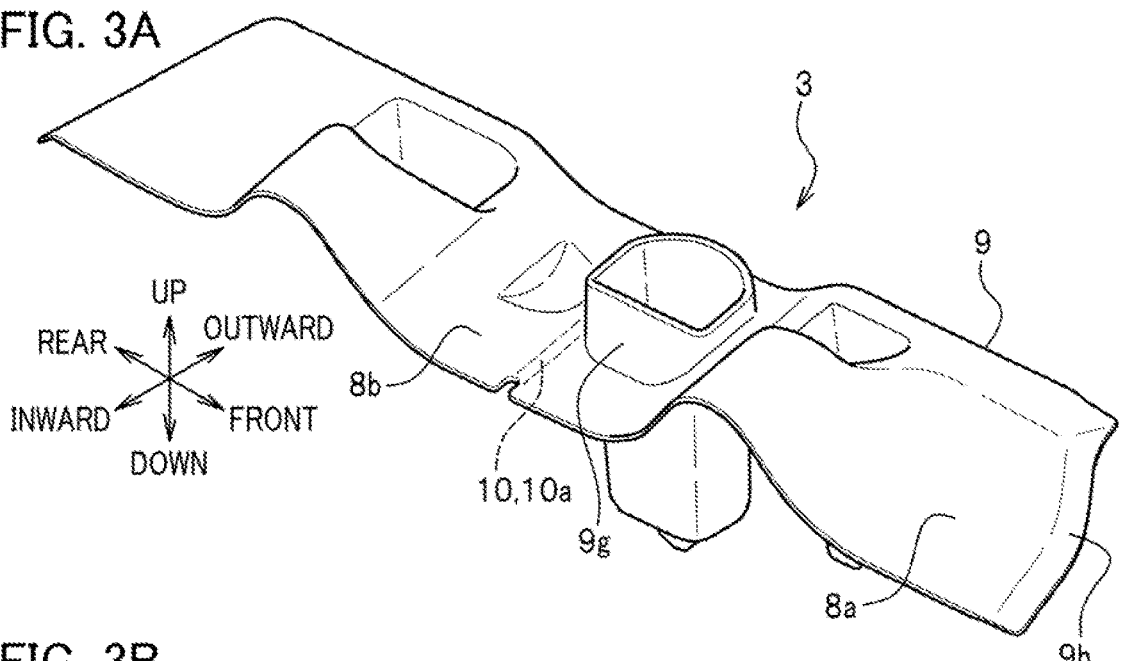
FIG. 3A is a perspective view of a partition member as seen obliquely from a position located above, forward of, and on an inner side with respect to the partition member.
Figure 3B:
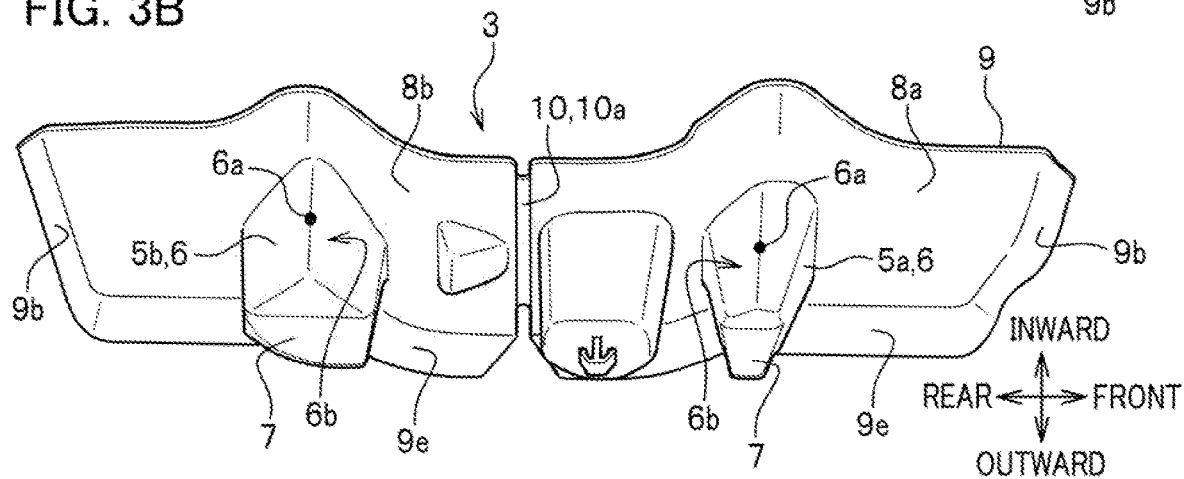
FIG. 3B is a perspective view of the partition member as seen obliquely from a position located below and on an inner side with respect to the partition member.
Figure 3C:
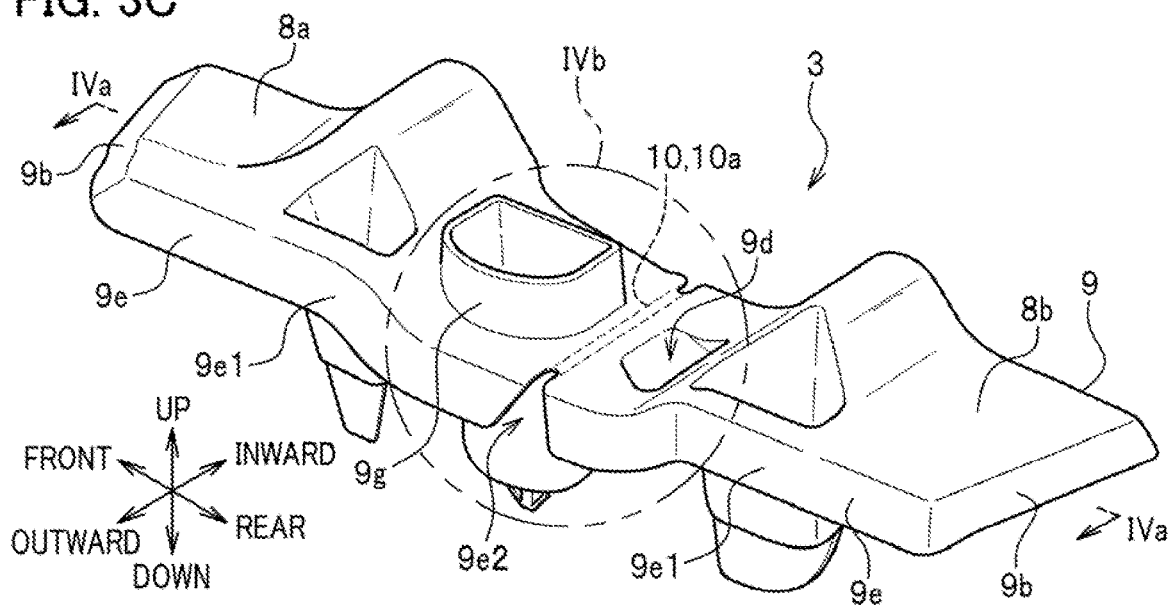
FIG. 3C is a perspective view of the partition member as seen obliquely from a position located above, rearward of, and on an outer side with respect to the partition member.
Figure 4A:
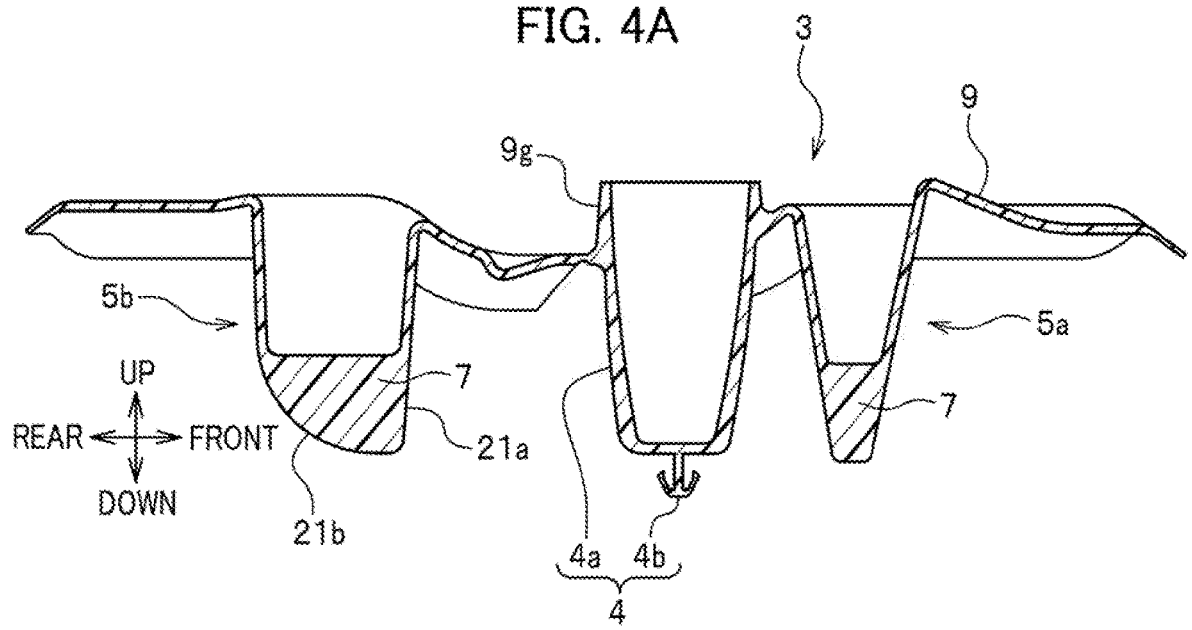
FIG. 4A is a cross-sectional view taken along line IVa-IVa in FIG. 3C.
Figure 4B:
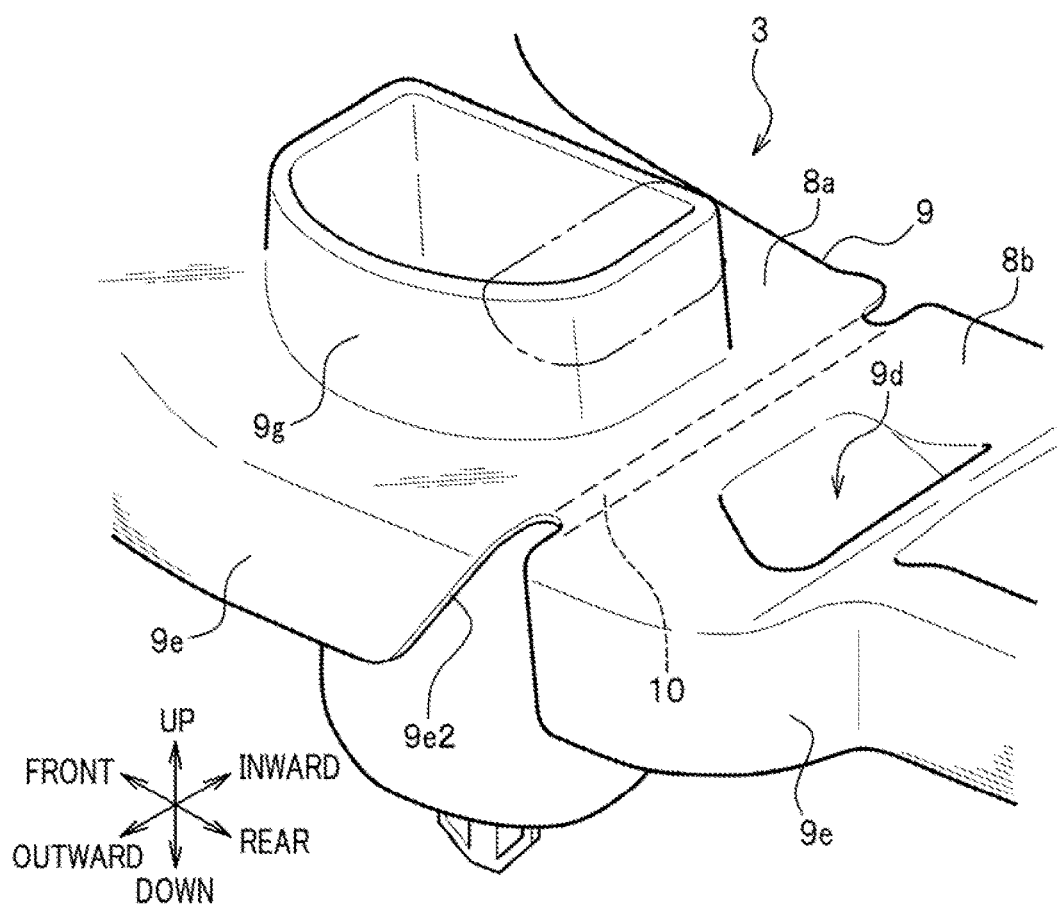
FIG. 4B is a partially enlarged perspective view of portion IVb in FIG. 3C.

FIG. 3A is a perspective view of the partition member 3 as seen obliquely from a position located above, forward of, and on an inner side with respect to the partition member 3. FIG. 3B is a perspective view of the partition member 3 as seen obliquely from a position located below and on an inner side with respect to the partition member 3. FIG. 3C is a perspective view of the partition member 3 as seen obliquely from a position located above, rearward of, and on an outer side with respect to the partition member 3. FIG. 4A is a cross-sectional view taken along line IVa-IVa in FIG. 3C. FIG. 4B is a partially enlarged perspective view of portion IVb in FIG. 3C.

Main Body Part

First, referring mainly to FIGS. 3A to 3C, a description will be given of the main body part 9 of the partition member 3.

As shown in FIGS. 3A to 3C, the main body part 9 is made of a curved plate body having a longitudinal length that extends in the vehicle front-rear direction.

The main body part 9 includes a first half body 8a and a second half body 8b located respectively in a vehicle front-rear direction forward part and a vehicle front-rear direction rearward part of the main body part 9. The first half body 8a and a second half body 8b are integrally formed with each other via a bending portion 10 located therebetween.

As shown in FIG. 2, the main body part 9 is arranged to extend along the front-rear direction of the side sill outer part 11 such that a lower face 9a of the main body part 9 faces the upper face 11a of the side sill outer part 11.

As shown in FIGS. 3A to 3C, the bending portion 10 of the main body part 9 has a smaller thickness than a general portion thereof due to a groove 10a formed in the lower face 9a of the main body part 9 and extending in the vehicle width direction (inward-outward direction). Note that the groove 10a is indicated by the hidden lines (dashed lines) in FIGS. 3A and 3C.

The bending portion 10 serves as a hinge connecting the first half body 8a and the second half body 8b to each other. In other words, the main body part 9 can be folded about an axis defined along the bending portion 10, in a restorable manner. Specifically, the main body part 9 can be valley folded about the bending portion 10 in a direction such that an upper surface of the first half body 8a and an upper surface of the second half body 8b become opposed to each other. In addition, the main body part 9 can be mountain folded about the bending portion 10 in a direction such that a lower surface of the first half body 8a and a lower surface of the second half body 8b become opposed to each other.

It should be noted that the bending portion 10 of the present embodiment is located substantially centrally with respect to a front-rear direction length of the main body part 9.

The main body part 9 has two end portions 9b located opposite each other in the vehicle front-rear direction. Each of these two end portion 9b is sloped downward in side view as seen from an inner side in the vehicle width direction, as shown in FIG. 2. Specifically, the end portion 9b of the first half body 8a is sloped downward such that the end portion 9b gradually extends downward as it extends forward, and the end portion 9b of the second half body 8b is sloped downward such that the end portion 9b gradually extends downward as it extends rearward.

The main body part 9 has projected portions which are projected upward at positions corresponding to the below-described support parts 5 inside view as seen from an inner side in the vehicle width direction, as shown in FIG. 2. These projected portions of the main body part 9 form sloped portions 9c1 and 9c2, which are described below in detail in relation to the support parts 5 (see FIG. 6A).

As shown in FIGS. 3B and 3C, the main body part 9 has a vehicle width direction outer end portion at which a downwardly extending edge portion 9e is formed. This downwardly extending edge portion 9e is formed over the entire vehicle front-rear direction length of the partition member 3 except the portion thereof corresponding to the bending portion 10.

The downwardly extending edge portion 9e has a sloped surface 9e1 that gradually extends outward in the vehicle width direction as it extends downward, as shown in FIG. 3C.

The downwardly extending edge portion 9e is formed integrally with two end portions 9b of the main body part 9, which are located opposite each other in the vehicle front-rear direction and sloped downward.

Note that, in FIG. 3C, reference numeral 9d designates a recessed portion formed by the main body part 9 being partially recessed downward; and reference numeral 9e2 designates a notch formed in the downwardly extending edge portion 9e at a position thereof corresponding to the bending portion 10.

The recessed portion 9d and the notch 9e2 are described in detail below.

Engagement Part

Next, a description will be given of the engagement part 4 (see FIG. 2) of the partition member 3

As shown in FIG. 4A, the engagement part 4 includes a barrel portion 4a formed integrally with the main body part 9 and a clip 4b formed at a lower end of the barrel portion 4a.

The barrel portion 4a is a bottomed tubular body which is formed by the main body part 9 being partially recessed downward.

The barrel portion 4a defines an opening on an upper face side of the main body part 9. A tubular wall part 9g having substantially the same shape as a transverse cross section of the barrel portion 4a is formed on a periphery of the opening to extend upward from the main body part 9.

Specifically, the wall part 9g is formed of a tubular body having a substantially semi-cylindrical transverse cross section, as shown in FIGS. 3A and 3C.

The wall part 9g is used as a holding portion for a user to hold when setting the partition member 3 onto the upper face 11a of the side sill outer part 11 (see FIG. 2), as described below.

The clip 4b is provided on the lower face of the barrel portion 4a, as shown in FIG. 4A.

The clip 4b is configured to be snap-fitted into the attachment hole 1b formed in the upper face 11a (see FIG. 2) of the side sill outer part 11 (see FIG. 2). The clip 4b of the present embodiment is assumed to be a protrusion with a barb that engages with the back side of a periphery of the attachment hole 1b when fitted therein. However, it is not limited thereto.

As shown in FIG. 4A, by holding the wall part 9g, which is to be located above the clip 4b, the user can easily insert the clip 4b to the attachment hole 1b (see FIG. 2) located at a lower position with respect to the opening 14 of the center pillar inner part 2a (see FIG. 1).

Support Part

Next, a description will be given of the support parts 5 of the partition member 3 (see FIG. 2).

As shown in FIG. 2, the support parts 5 are constituted by a first support part 5a and a second support part 5b. The first support part 5a is located forwardly of the engagement part 4 and provided on the first half body 8a. The second support part 5b is located rearwardly of the below-described recessed portion 9d and provided on the second half body 8b. Note that when it is not necessary to distinguish between the first support part 5a and the second support part 5b in the following description, they are each denoted merely by "support part(s) 5".

Each support part 5 includes a recess portion 6, which is a bottomed tubular portion formed by the main body part 9 being partially recessed downward, and a rib 7 extending downward from a lower face of the recess portion 6 and abutting the upper face 11a of the side sill outer part 11.

Recess Portion

As shown in FIG. 3B, the external shape of the recess portion 6 of the first support part 5a of the present embodiment is a substantially pentagonal truncated pyramid with a diameter decreasing downward.

The external shape of the recess portion 6 of the second support part 5b of the present embodiment is a substantially pentagonal column.

Each recess portion 6 has a side face portion 6b located on a vehicle width direction inner side and has a ridgeline 6a formed on the side face portion 6b to extend in the up-down direction so as to correspond to an apex of the pentagon of the recess portion 6.

The side face portion 6b of the recess portion 6 has the ridgeline 6a formed thereon as described above. This side face portion 6b is specifically described below in detail in relation to the injection holes 15 formed in the center pillar inner part 2a (see FIG. 1) with reference to FIGS. 6A and 6B.

Rib

As shown in FIG. 3B, the rib 7 of the present embodiment is formed such that a plate face thereof extends in the vehicle front-rear direction.

The rib 7 is located substantially centrally with respect to a vehicle width direction (inward-outward direction) length of the lower surface of the recess portion 6.

As shown in FIG. 4A, the rib 7 of the first support part 5a has the shape of an isosceles trapezoid with a width that gradually decreases in a downward direction in side view.

In addition, the rib 7 of the second support part 5b partially has an arc shape in side view.

Specifically, the rib 7 of the second support part 5b has a front side 21a extending downward from a front portion of the second support part 5b and an arc-shaped rear side 21b extending rearward and obliquely upward from a lower end of the front side 21a in side view as seen in the vehicle width direction. The arc-shaped rear side 21b is formed to be convex rearward and obliquely downward.

As described in detail below, the arc-shaped rear side 21b comes into sliding contact with the upper face 11a (see FIG.

2) of the side sill outer part 11 when attaching the partition member 3 to the upper face 11a.

Incidentally, the size of the recess portion 6 and rib 7 of the first support part 5a only needs to be large enough to support the partition member 3 at a predetermined position.

Incidentally, the size of the recess portion 6 of the second support part 5b only needs to be such that, to the degree the arc-shaped rib 7 can be formed, the recess portion 6 has a large vehicle front-rear direction width and has a large distance from the upper face 11a (see FIG. 2) of the side sill outer part 11.

Recessed Portion and Notch of Partition Member

As shown in FIG. 4B, which is an enlarged view of portion IVb in FIG. 3C, the recessed portion 9d is formed by the second half body 8b of the main body part 9 being partially recessed downward. This recessed portion 9d is located opposite to the wall part 9g with the bending portion 10 located therebetween.

The recessed portion 9d is formed to accommodate at least a portion of the wall part 9g when the main body part 9 is valley folded about the bending portion 10.

Note that the recessed portion 9d of the present embodiment imitates the shape of a rear upper corner of the wall part 9g, which rear upper corner is indicated by the enclosing virtual line (alternate long and two short dashes line) in FIG. 4B.

As shown in FIG. 4B, the notch 9e2 is formed by notching the downwardly extending edge portion 9e in the up-down direction at a position corresponding to the bending portion 10.

The downwardly extending edge portion 9e is divided into two halves in the vehicle front-rear direction by the notch 9e2 at the bending portion 10.

The notch 9e2 has one side (portion of the downwardly extending edge portion 9e, the portion being formed on the first half body 8a) and the other side (portion of the downwardly extending edge portion 9e, the portion being formed on the second half body 8b) with the bending portion 10 located therebetween, and a distance between the one side and the other side increases as the downwardly extending edge portion 9e extends downward. In other words, the notch 9e2 is formed by notching an isosceles triangular shaped portion of the downwardly extending edge portion 9e, which isosceles triangular shaped portion has an apex at an end portion of the bending portion 10 in side view.

The notch 9e2 prevents the interference between the downwardly extending edge portion 9e formed on the first half body 8a and the downwardly extending edge portion 9e formed on the second half body 8b when the main body part 9 is mountain folded about the bending portion 10.

Method of Manufacturing Vehicle Body Side Structure

Hereinbelow, a description will be given of a method of manufacturing the vehicle body side structure C according to the present embodiment, mainly by way of describing a method of installing the partition member 3 in the hollow space 2c of the center pillar 2.

Figure 5A:
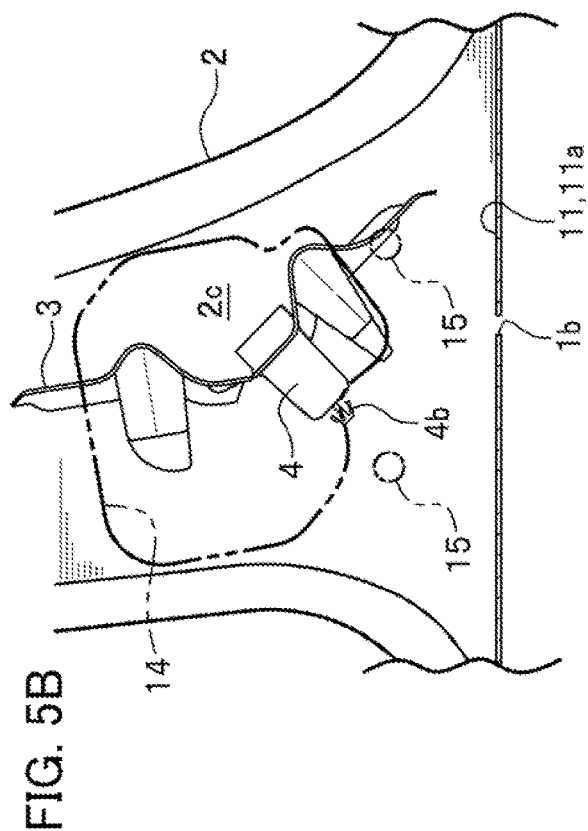
FIGS. 5A to 5D are assembly views of the partition member being assembled into a hollow space of a center pillar.

FIG. 5A is an explanatory view of a first step in the method of manufacturing the vehicle body side structure C, in which first step the partition member 3 is inserted into the hollow space 2c of the center pillar 2.

Figure 5B:
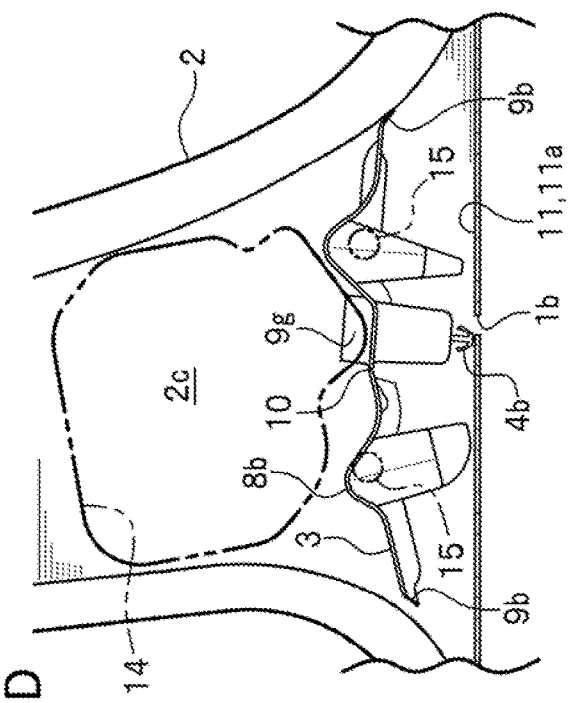

FIG. 5B is an explanatory view of a second step in the method of manufacturing the vehicle body side structure C, in which second step the partition member 3 is caused to unfold in the hollow space 2c of the center pillar 2.

Figure 5C:
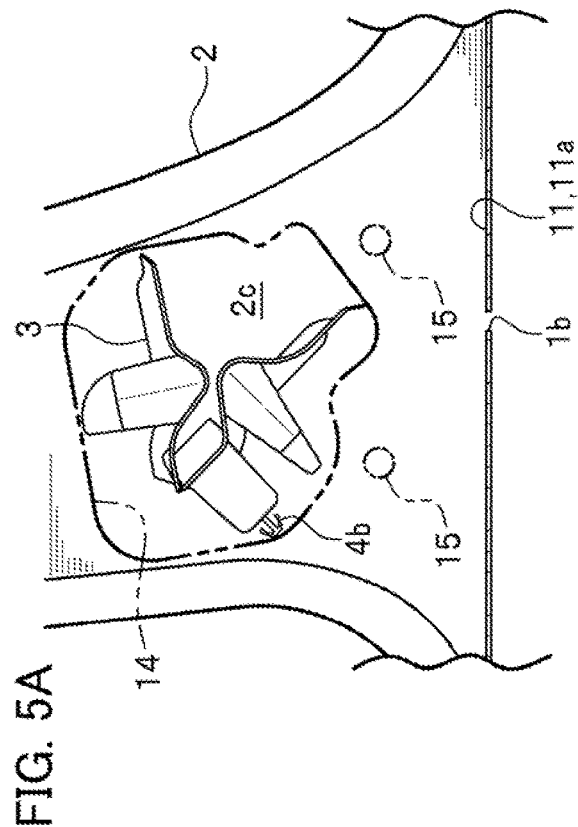

FIG. 5C is an explanatory view of a third step in the method of manufacturing the vehicle body side structure C,
in which third step the main body part 9 of the partition member 3 is caused to face the upper face 11a of the side sill outer part 11.

Figure 5D:
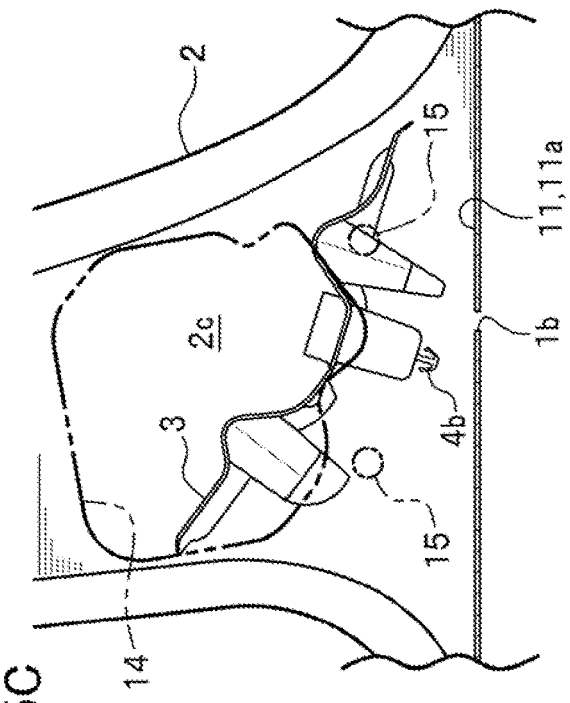

FIG. 5D is an explanatory view of a fourth step in the method of manufacturing the vehicle body side structure C, in which fourth step the partition member 3 is positioned in the hollow space 2c of the center pillar 2.

Note that in FIGS. 5A to 5D, illustration of the center pillar inner part 2a (see FIG. 1) is omitted; and the opening 14 and the foamable resin injection holes 15 of the center pillar inner part 2a are indicated by virtual lines (alternate long and two short dashes lines). In FIGS. 5A to 5D, reference numeral 1b designates the attachment hole formed in the upper face 11a of the side sill outer part 11 for attaching the partition member 3.

In the first step of the manufacturing method, as shown in FIG. 5A, the partition member 3 is brought from the vehicle width direction inner side, through the opening 14 of the center pillar inner part 2a, into the hollow space 2c of the center pillar 2.

In this operation, the partition member 3 is valley folded about the bending portion 10 (see FIG. 4B), so that a part of the wall part 9g (see FIG. 4B) is accommodated in the recessed portion 9d (see FIG. 4B).

Next, in the second step of this manufacturing method, as shown in FIG. 5B, the valley folded partition member 3 is caused to unfold in the hollow space 2c of the center pillar 2. In this event, the partition member 3 is caused to unfold so that the engagement part 4 faces downward.

Next, in the third step of this manufacturing method, as shown in FIG. 5C, the partition member 3 is arranged so that a lower face of the main body part 9 of the partition member 3 faces the upper face 11a of the side sill outer part 11. In other words, the partition member 3 is arranged to extend in the vehicle front-rear direction in the hollow space 2c of the center pillar 2.

Next, in the fourth step of this manufacturing method, as shown in FIG. 5D, the partition member 3 is arranged so that the two vehicle front-rear direction end portions 9b of the main body part 9 of the partition member 3 are opposed to inner walls of the lower end portions of the center pillar 2 from an underside thereof.

In this step, when the user holds the wall part 9g of the partition member 3, the second half body 8b of the partition member 3 pivots downward due to the self weight, about the bending portion 10 being an axis. The partition member 3 becomes mountain folded about the bending portion 10.

Then, although illustration is omitted, when the clip 4b of the partition member 3 is positioned close to the attachment hole 1b formed in the upper face 11a of the side sill outer part 11, the rib 7 of the second support part 5b comes into contact with the upper face 11a of the side sill outer part 11. Next, when the user inserts the clip 4b into the attachment hole 1b by moving the wall part 9g held by the user, the rib 7 of the second support part 5b slides over the upper face 11a of the side sill outer part 11 while making contact therewith, to thereby bring the end portion 9b of the second half body 8b upward.

In this way, the two end portions 9b of the main body part 9 can be easily brought to face the vehicle front-rear direction inner walls of the center pillar 2 from the underside thereof, each of which has a downward convex curve.

In addition, the sloped surface 9e1 of the downwardly extending edge portion 9e (see FIG. 3C) can be easily brought to face the vehicle width direction outer inner wall of the center pillar 2, which is inclined as described above, from the underside thereof.

Then, the clip 4b is snap-fitted into the attachment hole 1b and thereby the partition member 3 is attached to the upper face 11a of the side sill outer part 11. The two opposite end portions 9b of the main body part 9 are kept in a state in which they face the front-rear direction inner walls of the center pillar 2.

FIG. 6A is a side view of the partition member 3 installed in the hollow space 2c of the center pillar 2, as viewed from a vehicle width direction inner side. FIG. 6B is a cross-sectional view taken along line VIb-VIb in FIG. 6A. It should be noted that, in FIG. 6A, a center pillar inner part 2a is indicated by a virtual line (alternate long and two short dashes line) for the convenience of drawing the inside of the hollow space 2c of the center pillar 2. In FIG. 6A, reference numeral 14 designates the opening of the center pillar inner part 2a; and reference numerals 15 designate the foamable resin injection holes formed in the center pillar inner part 2a.

As shown in FIG. 6A, when the partition member 3 has been attached to the upper face 11a of the side sill outer part 11 via the engagement part 4, the support parts 5 support the main body part 9 such that that the main body part 9 and the upper face 11a of the side sill outer part 11 are spaced apart by a predetermined distance.

With this structure, the main body part 9 creates a filling chamber 17 for filling a foamable resin, between the main body part 9 and the upper face 11a of the side sill outer part 11.

As described above, the main body part 9 has projected portions 9f which are projected upward at positions corresponding to the first support part 5a and the second support part 5b in side view as seen from an inner side in the vehicle width direction, as shown in FIG. 6A.

With this structure, the main body part 9 includes a sloped portion 9c1 formed at a forward part of the first support part 5a and a sloped portion 9c2 formed at a rearward part of the second support part 5b.

The main body part 9 has a portion extending substantially horizontally from a bottom side of the sloped portion 9c1 toward a corresponding one of the two end portions 9b of the main body part 9 and has a portion extending substantially horizontally from a bottom side of the sloped portion 9c2 toward the other one of the two end portions 9b of the main body part 9.

The foamable resin injection holes 15 formed in the center pillar inner part 2a are located on an inner side of the projected portions 9f of the main body part 9 and face the filling chamber 17 for filling foamable resin.

That means the injection holes 15 are overlapped with the recess portions 6 as viewed in the vehicle width direction (inward-outward direction), as shown in FIG. 6B. With this structure, in the top view shown in FIG. 6B, the injection holes 15 respectively face the side face portions 6b of the recess portions 6, wherein the side face portions 6b respectively partially project toward the injection holes 15.

Incidentally, the projection of each of the side face portions 6b of the present embodiment is constituted by the above-described ridgeline 6a of the corresponding recess portion 6.

Process for Filling Foamable Resin

Next, a description will be given of a process for filling a foamable resin into the filling chamber 17 (see FIG. 6A).

This filling step injects uncured (liquid) foamable resin into the filling chamber 17 (see FIG. 5) via the injection hole 15 (see FIG. 6A) and causes the foamable resin to foam and be cured, to fill the filling chamber 17 with the cured foam.

The cured foamable resin of the present embodiment is assumed to be a hard urethane foam, but it is not limited thereto and may be another cured foam resin.

The hard urethane foam of the present embodiment is formed by urethane foam liquid being foamed and then cured.

Examples of the urethane foam liquid includes a mixture of an isocyanate liquid and a liquid in which polyether polyol is premixed with a foaming agent, such as cyclopentane and water, and with an auxiliary agent, such as a catalyst and a foam stabilizer.

As shown in FIG. 6B, when the foamable resin 12 (liquid) is injected into the filling chamber 17 through the injection holes 15 of the center pillar inner part 2a, each flow of the foamable resin 12 (liquid) is divided into two flows at the respective ridgelines 6a formed on the recess portion 6 of the corresponding support part 5.

The recess portions 6 of the partition member 3, which are formed at two places thereof spaced apart in the front-rear direction, divides the foamable resin 12 (liquid) into four flows, each of which spreads in the filling chamber 17 in a forward direction or in a rearward direction and forms a foaming point 12a.

As a result, as shown in FIG. 6A, the foamable resin 12 becomes a foam object having been evenly distributed in the filling chamber 17.

This foam object applies a load F to the lower surface of the main body part 9 from an underside thereof. This causes a moment M acting on the end portion 9b of the main body part 9 in an upward direction about an origin point Or where the main body part 9 is joined to the engagement part 4. This moment M causes a reaction force R from the inner wall of the center pillar 2 to the end portion 9b of the main body part 9. This results in a tight contact of the end portion 9b of the main body part 9 with the inner wall of the center pillar 2, thereby preventing the foamable resin 12 from leaking through a boundary between the partition member 3 and the inner wall of the center pillar 2.

In addition, the sloped surface 9e1 of the downwardly extending edge portion 9e (see FIG. 3C) comes into tight contact with the inner wall of the center pillar 2 in a manner similar to that described above, resulting in prevention of the foamable resin 12 from leaking through a boundary between the partition member 3 and the inner wall of the center pillar 2.

The vehicle body side structure C of the present embodiment is assumed such that, when the partition member 3 has been assembled to the center pillar 2, the end portions 9b and downwardly extending edge portions 9e of the main body part 9 are in tight contact with the inner wall of the center pillar 2. Note that, however, the vehicle body side structure C also includes a configuration in which a gap is present between the main body part 9 and the inner wall of the center pillar 2 when the partition member 3 has been assembled to the center pillar 2, if the main body part 9 is pushed up by the foam object of the foamable resin to come into tight contact with the inner wall of the center pillar 2 and as a result the gap is eliminated.

Operational Advantage

Next, a description will be given of operational advantages of the vehicle body side structure C according to the present embodiment.

The partition member 3 of the vehicle body side structure C of the present embodiment partitions the hollow space 2c of the center pillar 2 into upper and lower parts to create the filling chamber 17 in a lower end part of the center pillar 2. The filling chamber 17 is to be filled with a foamable resin (filler).

Thus, the partition member 3 of the vehicle body side structure C needs to be configured such that the main body part 9 of the partition member 3 be located at a higher position than the foamable resin injection hole 15, to ensure the volume of the filling chamber 17 for filling the foamable resin.

It is conceivable to form a rib extending from a main body part of a partition member so that the main body part is spaced apart from the side sill. This structure requires the rib have a certain length.

Such a vehicle body side structure, however, may suffer from the insufficient rigidity of the rib and the difficulty in integrally forming the main body part and the rib, as described above.

In contrast, the partition member 3 of the present embodiment includes the tubular recess portions 6, each of which is formed by the main body part 9 being partially recessed downward, and the ribs 7, each of which extends from a lower face of a corresponding one of the recess portions 6 and is brought into abutment with the upper face 11a of the side sill outer part 11 (side sill).

With the vehicle body side structure C having such partition member 3, as the ribs 7 are provided via the recess portions 6 to the main body part 9 of the partition member 3, the length of the ribs can be short even when the foamable resin filling chamber 17 is made large to ensure the volume thereof.

Therefore, the vehicle body side structure C of the present embodiment makes it possible to keep the rigidity of the ribs 7 high and makes it easy to integrally form the main body part 9 and the ribs 7.

According to the vehicle body side structure C of the present embodiment, the tubular recess portions 6 are disposed such that they are respectively overlapped with the foamable resin injection holes 15 when viewed in the vehicle width direction. The side face portion 6b, which is located on the vehicle width direction inner side of each recess portion 6, partially projects toward the corresponding injection hole 15 in top view.

With this vehicle body side structure C, the side face portion 6b of each recess portion 6 deflects the flow of the foamable resin injected through the corresponding injection hole 15 into the filling chamber 17. With this, the vehicle body side structure C makes it possible to widely distribute the foaming points 12a of the foamable resin 12 in the filling chamber 17.

That means, this vehicle body side structure C eliminates the need of providing a separate baffle plate to guide the flow of the foamable resin 12 and thus can control the flow of the foamable resin 12 in the filling chamber 17 with a simple configuration. As a result, the vehicle body side structure C makes it possible to distribute the foamable resin 12 evenly in the filling chamber 17.

The partially projecting side face portion 6b of each recess portion 6 of the vehicle body side structure C can restrain the injected foamable resin 12 from rebounding from the recess portion 6. Thus, the vehicle body side structure C can restrain the foamable resin 12 from rebounding and adhering to the inner wall of the center pillar inner part 2a.

Moreover, with the vehicle body side structure C, there will be no case in which foamable resin 12 having rebounded from the recess portions 6 will close another attachment hole configured for attaching another member and arranged near the injection holes 15 or will eliminate another space configured for arranging another member.

The partition member 3 of the vehicle body side structure C of the present embodiment includes the bending portion 10 providing a bending axis extending in the vehicle width direction, about which axis the partition member 3 can be bent and folded.

This vehicle body side structure C makes it easy to install the partition member 3 via the opening 14 into the hollow space 2c of the center pillar 2 by folding the partition member 3 about the bending portion 10.

The partition member 3 of the vehicle body side structure C of the present embodiment includes the recessed portion 9d, which is located opposite to the wall part 9g with the bending portion 10 located therebetween. The recessed portion 9d accommodates at least a portion of the wall part 9g when the main body part 9 is valley folded about the bending portion 10.

With this vehicle body side structure C, as the wall part 9g is accommodated in the recessed portion 9d, the main body part 9 can be valley folded such that the first half body 8a and the second half body 8b can get nearer to each other than a case in which the recessed portion 9d is not provided, and thus the partition member 3 can be folded in a compact configuration.

The center pillar 2 of the vehicle body side structure C of the present embodiment has a lower end portion which becomes wider as it extends toward its lower end and is curved so as to asymptotically approach the upper face 11a of the side sill outer part 11.

When the height of the main body part 9 from the upper face 11a of the side sill outer part 11 is increased due to the requirement of ensuring the volume of the filling chamber for the filling foamable resin as described above, the inner wall of the center pillar 2 approaches vertical at portions thereof corresponding to the end portions 9b of the main body part 9.

Therefore, the larger the height of the main body part 9 from the upper face 11a of the side sill outer part 11, it gets harder to bring the end portions 9b of the main body part 9 into tight contact with the inner wall of the center pillar 2.

According to the vehicle body side structure C of the present embodiment, a vehicle width direction inner part of the main body part 9 has sloped portions 9c1 and 9c2, each of which gradually slopes downward as it extends away from a corresponding one of the injection holes 15 in the vehicle front-rear direction in side view.

Therefore, the vehicle body side structure C provides a height increased by the projected portions 9f of the main body part 9 to adapt to the height of the injection holes 15 and provides the sloped portions 9c1 and 9c2, thereby allowing positioning the end portions 9b of the main body part 9 at the lower end portions of the center pillar 2 which asymptotically approach the upper face 11a of the side sill outer part 11.

With this, the vehicle body side structure C provides a sufficient volume of the filling chamber 17 and improves the tight contact of the end portions 9b of the main body part 9 with the inner wall of the center pillar 2. As a result, the vehicle body side structure C prevents the foamable resin from leaking out through a boundary between the partition member 3 and the inner wall of the center pillar 2.

The main body part 9 of the partition member 3 of the vehicle body side structure C has a vehicle width direction outer end portion at which the downwardly extending edge portion 9e is formed. The downwardly extending edge portion 9e has the sloped surface 9e1, which gradually extends outward in the vehicle width direction as it extends downward.

With this vehicle body side structure C, the vehicle width direction outer side of the partition member 3 comes into abutment with the inner wall of the center pillar outer part 2b from the underside thereof and restrains the foamable resin 12 from leaking from the filling chamber 17.

The downwardly extending edge portion 9e of the partition member 3 of the vehicle body side structure C includes a notch 9e2. This notch 9e2 has one side and the other side with the bending portion 10 located therebetween, and a distance between the one side and the other side increases as the notch 9e2 extends downward.

This aspect of the vehicle body side structure C divides the downwardly extending edge portion 9e into two halves with the notch 9e2 located therebetween and prevents the interference between the two halves when the partition member 3 is mountain folded in the hollow space 2c of the center pillar 2.

According to the vehicle body side structure C, the end portions 9b and downwardly extending edge portion 9e of the main body part 9 of the partition member 3 are integrally formed.

This aspect of the vehicle body side structure C improves the rigidity of the main body part 9.

The partition member 3 of the vehicle body side structure C includes the bending portion 10, which is configured to allow the partition member 3 to be mountain folded about the bending portion 10.

With this aspect of the vehicle body side structure C, the two front-rear direction end portions 9b of the partition member 3 can be easily brought to respectively face the front-rear direction inner walls of the center pillar 2 from the underside thereof, each of which has a downward convex curve. This structure makes it possible to cause the two end portions 9b of the partition member 3 and the inner walls of the center pillar 2 to reliably come into tight contact with each other when the foamable resin is filled in the hollow space 2c of the center pillar 2.

The vehicle body side structure C includes the rib 7 under the first support part 5a, which is located opposite to the bending portion 10 with the clip 4b located therebetween in the vehicle front-rear direction, i.e., on the first half body 8a side of the main body part 9.

With this vehicle body side structure C, the partition member 3 can be easily positioned with respect to the upper face 11a of the side sill outer part 11 by the rib 7 coming into abutment with the upper face 11a. Moreover, with this vehicle body side structure C, the partition member 3 can be restricted from moving when the partition member 3 is being assembled into the hollow space 2c of the center pillar 2.

The partition member 3 of the vehicle body side structure C has the single clip 4b only.

With this aspect of the vehicle body side structure C, attaching the single clip 4b to the upper face 11a of the side sill outer part 11 positions the partition member 3 with respect thereto and fixes it at a predetermined position. Therefore, the vehicle body side structure C makes it easy to perform the installation of the partition member 3. Moreover, with this aspect of the vehicle body side structure C, the structure of the partition member 3 is simplified.

Incidentally, according to the vehicle body side structure C, the second half body 8b of the main body part 9 is located opposite to the clip 4b with the bending portion 10 located therebetween and is positioned by the rib 7 of the second support part 5b with respect to the upper face 11a of the side sill outer part 11. For this reason, no clip is needed for the second half body 8b.

Although an embodiment of the present invention has been described above, the present invention is not limited to the embodiment described above and can be carried out in various modes.

Each support part 5 of the above-described embodiment is formed to include the recess portion 6 whose transverse cross section is substantially in the shape of a pentagon and the ridgeline 6a thereof faces the corresponding injection hole 15, so that the side face portion 6b of the recess portion 6 partially project toward the injection hole 15.

However, the shape of the transverse cross section of the recess portion 6 of the vehicle body side structure C is not limited to a pentagon so long as the side face portion 6b of the recess portion 6 partially projects toward the corresponding injection hole 15. Therefore, the transverse cross section of the recess portion 6 may be in the shape of a polygon, a circle, or an ellipse.

Moreover, the side face portion 6b of each recess portion 6 may be constituted by a surface having a predetermined angle with respect to the vehicle front-rear direction in top view if the surface can guide the foamable resin (filler) injected from the corresponding injection hole 15 in a predetermined direction.

What is claimed is:

1. A vehicle body side structure comprising:
a side sill extending in a vehicle front-rear direction;
a center pillar outer part that extends upward from the side sill;
a center pillar inner part arranged on a vehicle width direction inner side of the center pillar outer part; and
a partition member arranged in a hollow space defined by the center pillar outer part and the center pillar inner part, the partition member extending in the vehicle front-rear direction,
wherein the partition member incudes:
a main body part;
a recess portion having a tubular shape, the recess portion being formed by the main body part being partially recessed downward; and
a rib extending downward from a lower face of the recess portion, the rib being in abutment with an upper face of the side sill, and
wherein the main body part of the partition member includes:
a bending portion constituting an axis extending in a vehicle width direction, about which axis the main body part can be bent;
a clip extending downward;
a wall part extending upward from a portion of an upper face of the main body part, the portion of the upper face being located at a position corresponding to the clip; and
a recessed portion located opposite to the wall part with the bending portion located therebetween, wherein at least a portion of the wall part is accommodated in the recessed portion when the main body part is valley folded about the bending portion.

2. The vehicle body side structure according to claim 1, wherein the center pillar inner part has a lower end portion in which an injection hole for injecting a filler is formed,
wherein the recess portion is arranged so as to overlap with the injection hole when viewed in a vehicle width direction, and wherein the recess portion has a side face portion located on a vehicle width direction inner side, the side face portion partially projecting toward the injection hole in top view.

3. The vehicle body side structure according to claim 1, wherein the center pillar inner part has a lower end portion in which an injection hole for injecting a filler is formed, wherein the main body part of the partition member has two end portions located opposite each other in the vehicle front-rear direction and sloped downward, and wherein the main body part of the partition member has a vehicle width direction inner end portion having a sloped portion which gradually slopes downward in side view as the sloped portion extends away from the injection hole in the vehicle front-rear direction.

4. The vehicle body side structure according to claim 2, wherein the main body part of the partition member has two end portions located opposite each other in the vehicle front-rear direction and sloped downward, and wherein the main body part of the partition member has a vehicle width direction inner end portion having a sloped portion which gradually slopes downward in side view as the sloped portion extends away from the injection hole in the vehicle front-rear direction.

5. The vehicle body side structure according to claim 1, wherein the main body part of the partition member includes:

a downwardly extending edge portion formed on a vehicle width direction outer end portion of the main body part and having a sloped surface which gradually extends outward in the vehicle width direction as the sloped surface extends downward, wherein the downwardly extending edge portion has a notch extending in an up-down direction and located at a position corresponding to the bending portion, and wherein the notch has one side and the other side with the bending portion located therebetween and a distance between the one side and the other side increases as the notch extends downward.

6. The vehicle body side structure according to claim 2, wherein the main body part of the partition member includes:

a downwardly extending edge portion formed on a vehicle width direction outer end portion of the main body part and having a sloped surface which gradually extends outward in the vehicle width direction as the sloped surface extends downward, wherein the downwardly extending edge portion has a notch extending in an up-down direction and located at a position corresponding to the bending portion, and wherein the notch has one side and the other side with the bending portion located therebetween and a distance between the one side and the other side increases as the notch extends downward.

7. The vehicle body side structure according to claim 3, wherein the main body part of the partition member includes:

a downwardly extending edge portion formed on a vehicle width direction outer end portion of the main body part and having a sloped surface which gradually extends outward in the vehicle width direction as the sloped surface extends downward, wherein the downwardly extending edge portion has a notch extending in an up-down direction and located at a position corresponding to the bending portion, and wherein the notch has one side and the other side with the bending portion located therebetween and a distance between the one side and the other side increases as the notch extends downward.

8. The vehicle body side structure according to claim 4, wherein the main body part of the partition member includes:

a downwardly extending edge portion formed on a vehicle width direction outer end portion of the main body part and having a sloped surface which gradually extends outward in the vehicle width direction as the sloped surface extends downward, wherein the downwardly extending edge portion has a notch extending in an up-down direction and located at a position corresponding to the bending portion, and wherein the notch has one side and the other side with the bending portion located therebetween and a distance between the one side and the other side increases as the notch extends downward.

\* \* \* \* \*